Patented July 7, 1953

2,644,815

UNITED STATES PATENT OFFICE

2,644,815

PROCESS FOR PRODUCING DEXTRAN PRODUCTS HAVING SUBSTANTIALLY UNIFORM MOLECULAR SIZE FOR PHARMACEUTICAL AND THERAPEUTIC PREPARATIONS

Anders Johan Troed Grönwall and Björn Gustaf-Adolf Ingelman, Uppsala, Sweden, assignors to Aktiebolaget Pharmacia, Stockholm, Sweden, a company of Sweden No Drawing. Application September 30, 1949, Serial No. 119,002. In Sweden October 15, 1948

7 Claims. (Cl. 260—209)

Like partially hydrolysed or degraded dextran, crude dextran is polydisperse, i. e. not uniform in respect of molecular weight. Especially when dextran solutions are injected intravenously (e. g. when partially degraded dextran is used as a plasma substitute), it has proved that the physiological effect of the dextran molecules is, inter alia, in a high degree dependent upon the size of these molecules. Dextran of too high molecular weight causes injurious reactions on intravenous infusion, and too small dextran molecules may leave the blood vessels too quickly through the capillaries and through the glomerulus membranes in the kidneys. Similarly, the viscosity of the solutions of dextran or partially degraded dextran used for pharmaceutical preparations is dependent on the molecular weight. It is therefore obviously an advantage to be able to produce more uniform dextran preparations. Also when dextran is used in solutions for function tests, e. g. of the kidneys, it is of very great advantage to use dextran preparations which are more uniform in respect of molecular size.

It has now been found that molecularly more uniform dextran preparations than it has hitherto been possible to obtain can be produced according to the present invention by exploiting the different solubilities of dextran molecules of different sizes, which make it possible to produce, by fractional treatment, solutions that in respect of the molecular weight contain substantially uniform dextran, which may then be precipitated. It is thus also possible to fractionate dextran and partially degraded dextran in more uniform fractions. Such fractionating may be undertaken by precipitating the dextran from dextran solutions by a regulated addition of a suitable precipitating agent which is a non-solvent for dextran.

As precipitating agents may, for instance, be used alcohols and ketones which are wholly or partially miscible with water. Examples hereof are ethyl alcohol, methyl alcohol, propyl alcohol and acetone, methyl ethyl ketone and diethyl ketone, respectively. As a further example of a suitable precipitating agent may be mentioned dioxane.

Another possibility is to dissolve the dextran or partially degraded dextran successively in mixtures of solvent and precipitating agent in different proportions. Examples of solvents for dextran and partially degraded dextran are water, and formamide, and such mixtures of solvent and precipitating agent may consist of water and one of the above-mentioned precipitating agents, e. g. water and ethyl alcohol, water and acetone etc. The fractions thus obtained are less polydisperse than the primary substance, and are more suitable than the primary substance for use as plasma substitutes or in pharmaceutical preparations.

According to the invention, it has been found that if the fraction of highest molecular weight can be removed this is in itself enough to ensure a considerable reduction of the dextran influence on the sedimentation rate of the erythrocytes when using partially degraded dextran for infusion purposes.

In the following will be adduced some examples of how, by gradually increasing the concentration of the precipitating agent, it is possible to obtain a fractionated precipitation of, in respect to the molecular weight, more uniform fractions. If, namely, while stirring vigorously, a precipitating agent is added slowly to a dextran solution, such a concentration of the precipitating agent is finally attained that the dextran beings to precipitate.

The dextran that is first precipitated is the fraction of highest molecular weight in the polydisperse primary substance. If the concentration of the precipitating agent is then successively increased, precipitates of dextran of decreasing molecular weights are obtained. In this way are obtained fractions that are considerably less polydisperse than is the primary substance, which may be shown by e. g. ultra-centrifugation and diffusion tests. The higher the molecular weight of the fraction, the higher will be the viscosity.

The fractionated dissolution of dextran does not, in principle, differ from the fractionated precipitation, as both the fractionated dissolution and the fractionated precipitation are enabled by the fact that dextran molecules of different sizes have different solubilities. The fractionated dissolution can be carried out by shaking finely pulverized dextran or partially degraded dextran with a mixture of solvent and precipitating agent so chosen that a fraction of lower molecular weight goes into solution and a fraction of higher molecular weight of the polydisperse primary substance remains undissolved. As in the case of the fractionated precipitation, also hereby fractions are obtained that are more uniform in respect of the molecular size than is the primary substance.

EXAMPLE 1.—FRACTIONATED PRECIPITATION WITH ETHYL ALCOHOL

As primary substance was used a partially degraded dextran. 250 ml. of 2% solution in water of this dextran was poured into a flask, which was then lowered into a thermostat. The flask was provided with a stirrer, and 96% ethyl alcohol was added dropwise with the help of a burette. The temperature was kept at +20° C. When sufficient alcohol has been added to render the solution cloudy, the temperature in the thermostat was raised to 25–30° C. After some hours the precipitate was dissolved, and the contact thermometer in the thermostat was again adjusted to 20° C. The solution was allowed to stand thus overnight. When the temperature decreased the precipitate came back and was separated off by decantation. The precipitate was dissolved in water and precipitated again with ethyl alcohol. A further reprecipitation was carried out in the same way. The decanted solution was poured back into the flask, which had been lowered into the thermostat. Alcohol was once more added with the burette. The resultant precipitate was treated in the same manner as before. The fractionation was continued in the same way, altogether five fractions being taken in this way. The dextran fractions obtained were dried and weighed, and the intrinsic viscosity $[\eta]$ for water-solutions prepared from these fractions was determined. $[\eta] = \lim. \eta \, sp/c$ when $c \to 0$ (where $\eta_{sp}$ = the specific viscosity $c$ = the concentration in percent. $[\eta]$ increases when the molecular weight of the dextran increases). Ultracentrifugation tests showed that the substances obtained were less polydisperse than the primary substance. The results are given in tabular form below:

Table I

| Series no. of fraction | Alcohol in ml. | Weight of fraction in g. | $[\eta]$ |
| --- | --- | --- | --- |
| K I | 146.1 | 1.62 | 1.50 |
| K II | 17.6 | 0.27 | 1.30 |
| K III | 6.5 | 0.16 | 0.92 |
| K IV | 13.0 | 0.44 | 0.70 |
| K V | 60.0 | 0.29 | 0.40 |

EXAMPLE 2.—FRACTIONATED PRECIPITATION WITH ETHYL ALCOHOL 40 g. of partially degraded dextran was dissolved in 2 liters of water in a suitable vessel. Ethyl alcohol was added carefully as in Example 1 at room temperature. When some precipitate has been formed the mixture was warmed to 40° C., so that the precipitate was again dissolved. The vessel was then lowered into a thermostat with a temperature of +20° C. and left to stand overnight. The precipitate formed was isolated by decantation. The precipitate was dissolved and reprecipitated twice. The fractionating was continued in the same way by successively increasing the concentration of alcohol. When five fractions have been obtained the fractionating was discontinued. The results of the experiments are summarized in Table II. The centrifugation and diffusion tests showed that the fractions obtained were considerably more uniform in respect of the molecular weight than was the primary substance.

Table II

| Series no. of fraction | Alcohol in ml. | Weight of fraction in g. | $[\eta]$ |
| --- | --- | --- | --- |
| F I | 1,475 | very little | |
| F II | 90 | 2.67 | 0.48 |
| F III | 70 | 3.59 | 0.38 |
| F IV | 120 | 6.40 | 0.29 |
| F V | 150 | 4.16 | 0.25 |

EXAMPLE 3.—FRACTIONATED PRECIPITATION WITH ETHYL ALCOHOL

For this experiment was used a partially hydrolysed dextran which was still more degraded than the substance used in Example 2. 200 ml. of 2% aqueous dextran solution was used for the experiment. The fractionating was carried out in the same way as in Example 2 by successively increasing the concentration of the alcohol. Ultra-centrifugation and diffusion tests showed that the fractions obtained were considerably more uniform in respect of the molecular weight than was the primary substance. The results are given in the following table:

Table III

| Series no. of fraction | Alcohol in ml. | Weight of fraction in g. | $[\eta]$ |
| --- | --- | --- | --- |
| I | 180 | 0.86 | 0.18 |
| II | 35 | 1.51 | 0.13 |
| III | 50 | 0.66 | 0.11 |
| IV | 10 | 0.41 | 0.09 |

(The last fraction was obtained after the solution had been concentrated to a small volume.)

EXAMPLE 4.—FRACTIONATED PRECIPITATION WITH ETHYL ALCOHOL 7 kgs. of partially degraded dextran were dissolved in distilled water to a 70 kgs. solution. The solution was kept at a temperature of about 10° C. over room temperature (20° C.). At first was added 37.6 kgs. of 95% ethyl alcohol while stirring. The mixture was allowed to stand at room temperature. A precipitate was then formed, and this was removed. Hereupon a further 40 kgs. of alcohol was added, and the precipitate then formed was removed after allowing the mixture to stand at room temperature (20° C.). The precipitate was dried and weighed. The precipitate obtained in the first experiment weighed 1.1 kgs. and that obtained in the second 4.6 kgs. From these two fractions 6% water solutions were prepared, after which the viscosity was measured. The relative viscosity was for the first fraction 4.9 and for the second 3.5. The second fraction (the main fraction) had been freed by the fractionating from a more high-molecular fraction (fraction 1) at the same time as a certain amount of more low-molecular dextran was lost on the precipitation. In this way was obtained a substance that is still better suited for e. g. infusion purposes than the unfractionated primary substance.

EXAMPLE 5.—FRACTIONATED DISSOLUTION WITH ETHYL ALCOHOL 3.00 g. of finely pulverized partially degraded dextran was suspended in a mixture of 50 ml of water and 34 ml. of 96% ethyl alcohol. The mixture was kept at 25.0° C. for twenty-four hours and shaken at intervals. The liquid that was uppermost was then poured off. From this the dextran was precipitated by the addition of excess alcohol. Both this dextran and the dextran that has not gone into solution were dried at 105° C. In carrying out the experiments 2% solutions in water were prepared from the two samples, as also from the original partially degraded dextran. For these three solutions the viscosity was measured at 25.0° C. The specific viscosity for the original substance was 0.56, for the undissolved dextran 0.58 and for the dextran that went into solution 0.40. This experiment shows that it is possible to obtain a fractionation also in this way.

By adding to a dextran solution of a certain concentration a precipitating agent in a certain proportion in relation to the solvent, it is also possible to separate from the primary material a certain fraction containing dextran with undesired molecular weight.

EXAMPLE 6.—FRACTIONATED PRECIPITATION WITH METHYL ALCOHOL

To 50 ml. of a 6% water-solution of a partially hydrolysed dextran were added while stirring successively increased amounts of methyl alcohol. In all, five fractions were obtained and recovered. Fraction 1, which was yielded by the lowest methyl alcohol concentration, had the highest viscosity and molecular weight. The result may be seen from the table below:

Table IV

| Fraction | Methyl alcohol in ml. | Weight of fraction in g. | Intrinsic viscosity |
|---|---|---|---|
| I | 46 | 0.8 | 0.28 |
| II | 3 | 0.5 | 0.23 |
| III | 3 | 0.3 | 0.19 |
| IV | 5 | 0.7 | 0.15 |
| V | evaporated | 0.4 | 0.12 |

EXAMPLE 7.—FRACTIONATED DISSOLUTION WITH DIOXANE

A partially hydrolysed, dry, finely pulverized dextran, which in 2% water-solution had a specific viscosity of 0.50, was shaken with a mixture of 50 volume-parts of water and 45 volume-parts of dioxane for some hours at 20° C. The undissolved residue was dried. A 2% solution of this fraction had a specific viscosity of 0.53. The dextran which had gone into solution (about one-third of the primary substance) was also isolated. A 2% solution of this fraction had a specific viscosity of 0.42.

EXAMPLE 8.—FRACTIONATED PRECIPITATION WITH DIOXANE

To 50 ml. of a water-solution containing 6% of a partially hydrolysed dextran and 0.9% NaCl was added while stirring 50 ml. dioxane, after which it was left to stand at 20° C. for 3 hours. The bottom phase (fraction 1) was separated off by decantation and dried. To the solution was added a further 10 ml. dioxane, after which the bottom phase (fraction 2) was separated off in the same way by decantation and dried. Finally, a further 100 ml. dioxane was added to the solution, after which the precipitate (fraction 3) was separated off in the same way by decantation and dried. In Table V may be seen the weight of the fractions and their relative $(\eta/\eta_0)$ and specific viscosity $(\eta/\eta_0-1)$, measured for 2% solutions at 25° solutions at 25° C. As may be seen from the table, it is possible to fractionate the polymolecular dextran in this way.

Table V

| Fraction | Weight in g. | Rel. viscosity (2%) $(\eta/\eta_0)$ | Specific viscosity (2%) $(\eta/\eta_0-1)$ |
|---|---|---|---|
| Primary substance | | 1.57 | 0.57 |
| I | 1.3 | 1.73 | 0.73 |
| II | 0.9 | 1.44 | 0.44 |
| III | 0.6 | 1.27 | 0.27 |

EXAMPLE 9.—EXAMPLE OF FRACTIONATED PRECIPITATION AND FRACTIONATED DISSOLUTION WITH ETHYL ALCOHOL

To 50 ml. of a 3% dextran solution in water was added while stirring 35 ml. ethyl alcohol. This resulted in the formation of a gel-like precipitate which was separated off. Dextran remaining in the solution was isolated by evaporation. This dextran fraction, which weighed 0.1 g., had an intrinsic viscosity $[\eta]=0.34$. The gel-like precipitate was shaken with a mixture of 50 ml. water and 30 ml. ethyl alcohol. The solution was decanted off and concentrated to dryness, yielding 0.3 g. of substance, whose intrinsic viscosity $[\eta]$ was 0.71. The remaining undissolved gel-like precipitate was dried separately, yielding 1.0 g., whose intrinsic viscosity $[\eta]$ was 0.95.

EXAMPLE 10.—FRACTIONATED PRECIPITATION WITH ACETONE

In a similar way a water solution of a partially hydrolysed dextran was fractionated by the successive addition of acetone (30 ml. of a dextran-solution containing 6.2 g. dextran/100 ml.). In all, five fractions were obtained and recovered, fraction 1, which was yielded by the lowest acetone concentration, having the highest viscosity and molecular weight. The result may be seen in Table VI, where the intrinsic viscosity is given for the five fractions.

Table VI

| Fraction No. | Weight of fraction in g. | Acetone in ml. | Intrinsic viscosity $[\eta]$ |
|---|---|---|---|
| I | 0.32 | 13.5 | 0.40 |
| II | 0.59 | 1.0 | 0.31 |
| III | 0.24 | 1.0 | 0.27 |
| IV | 0.31 | 2.0 | 0.17 |
| V | 0.26 | 5.0 | 0.13 |

EXAMPLE 11.—FRACTIONATED PRECIPITATION WITH ACETONE FROM FORMAMIDE-SOLUTION 2 g. of a partially hydrolysed dextran was dissolved in 50 ml. formamide. While stirring, 25 ml. acetone was added, after which the mixture was left to stand at 20° C. for 2 hours. The precipitate formed (fraction 1, constituting about half of the primary substance) was separated off and reprecipitated. The remaining dextran in the solution was precipitated by the addition of excess of acetone (fraction 2). Also this fraction was reprecipitated. The specific viscosity $(\eta/\eta_0-1)$ for 2% solutions of the primary substance, fraction 1, and fraction 2 was 0.44, 0.53 and 0.26 respectively.

EXAMPLE 12.—FRACTIONATED PRECIPITATION WITH ACETONE

To 200 ml. of a water-solution containing 6% of a partially hydrolysed dextran and 0.9% NaCl was added 98 ml. acetone while stirring. The precipitate formed was allowed to stand for some hours at 20° C. The solution was decanted off and the precipitate (fraction 1) was dried. A further 5 ml. acetone was added to the solution, after which the precipitate (fraction 2) was separated off in the same way and dried. A further 10 ml. acetone was added and fraction 3 was separated off and dried. To the separated solution was added a further 25 ml. acetone. Fraction 4 was separated off and dried. Finally, 100 ml. acetone was added to the solution, after which the precipitate (fraction 5) was separated off and dried. Of the five fractions 2.0% solutions were prepared, for which the viscosity was measured at 25° C. The values obtained may be seen in the table.

Table VII

| Fraction | Specific viscosity for 2% solution (25° C.) ($\eta/\eta_0-1$) |
|---|---|
| I | 0.80 |
| II | 0.54 |
| III | 0.41 |
| IV | 0.31 |
| V | 0.22 |

EXAMPLE 13.—FRACTIONATED DISSOLUTION WITH ACETONE 2 g. of partially hydrolysed, dry, finely pulverized dextran was shaken with a mixture of 25 ml. water and 15 ml. acetone for four hours at 20° C. The solution (fraction 1) and the undissolved substance (fraction 2) were separated by decantation and dried separately. The specific viscosity for 2% water-solutions of these two fractions and the original substance was determined, as was also the weight of the fractions. The results are given in the table below:

Table VIII

| Fraction | Weight in g. | Specific viscosity for 2% solutions ($\eta/\eta_0-1$) |
|---|---|---|
| Original substance | | 0.44 |
| I | 0.2 | 0.25 |
| II | 1.8 | 0.46 |

EXAMPLE 14.—FRACTIONATED DISSOLUTION WITH METHYL ALCOHOL 18 g. of partially hydrolysed, finely pulverized dextran was shaken with a mixture of 245 ml. water and 205 ml. methyl alcohol for 24 hours at 25° C. The solution (fraction 1) was separated from the undissolved substance (fraction 2) and dried whereupon the weight and intrinsic viscosity [$\eta$] of the fractions were determined. The result is seen from the table below:

Table IX

| Fraction | Weight in g. | Intrinsic viscosity [$\eta$] |
|---|---|---|
| I | 6 | 0.20 |
| II | 12 | 0.28 |

In the abovementioned examples, the fractionated precipitating and fractionated dissolution has been carried out within a temperature range of 20–30° C., but it is obvious that the treatment in question may also take place at temperatures below or above said temperature range.

We claim:

1. In the production of dextran preparations of substantially uniform molecular size, the process which comprises adding, to an aqueous solution of partially-degraded dextran having a wide range of molecular size, a quantity of a water-miscible organic solvent which is a non-solvent for dextran and selected from a class consisting of alcohols and ketones, the amount added being only sufficient to produce a precipitate and to leave a substantial quantity of dextran still dissolved, removing the resulting precipitate containing a relatively-uniform high-molecular dextran fraction from the solution, adding an additional quantity of the organic solvent to the solution sufficient to form a second precipitate therein while leaving a quantity of low-molecular dextran still dissolved, and recovering the said second precipitate containing dextran of a relatively-uniform intermediate molecular size.

2. In the production of dextran preparations of substantially uniform molecular size, the process which comprises adding, to an aqueous solution of partially degraded dextran having a wide range of molecular size, a quantity of a water-miscible alcohol which is a non-solvent for dextran, the amount added being only sufficient to produce a precipitate and to leave a substantial quantity of dextran still dissolved, removing the resulting precipitate containing a relatively-uniform high-molecular dextran fraction from the solution, adding an additional quantity of alcohol to the solution sufficient to form a second precipitate therein while leaving a quantity of low-molecular dextran still dissolved, and recovering said second precipitate containing dextran of a relatively-uniform intermediate molecular size.

3. The process of claim 2 wherein the alcohol is ethyl alcohol.

4. The process of claim 2 wherein the alcohol is methyl alcohol.

5. The process of claim 2 wherein the alcohol is propyl alcohol.

6. In the production of dextran preparations of substantially uniform molecular size, the process which comprises treating partially-degraded dextran having a wide range of molecular size with an aqueous solution of a water-miscible organic solvent which is a non-solvent for dextran and selected from a class consisting of alcohols and ketones, only sufficient water being present in the solution to dissolve a relatively-uniform low-molecular fraction of the dextran leaving a substantial fraction undissolved, recovering said low-molecular fraction from the solution, treating the undissolved dextran with another aqueous solution of organic solvent containing less of the organic solvent, sufficient to prevent solution of a high-molecular fraction present but sufficient water being present to dissolve a relatively-uniform intermediate dextran fraction, and recovering said intermediate fraction from the solution.

7. In the production of dextran preparations of substantially uniform molecular size, the process which comprises adding, to an aqueous solution of partially degraded dextran having a wide range of molecular size, a quantity of a water-miscible organic solvent which is a non-solvent for dextran and selected from a class consisting of alcohols and ketones, the amount added being sufficient to form a precipitate while leaving a substantial quantity of dextran still dissolved, separating the said precipitate from the solution, recovering the low-molecular dextran fraction remaining in the solution, treating the precipitate with an aqueous solution of said organic solvent containing a smaller proportion of solvent than that added to the original aqueous solution of dextran, sufficient water being present to dissolve a fraction of dextran of intermediate molecular size from said precipitate while leaving a high-molecular fraction undissolved, and recovering said intermediate and said high-molecular fractions of dextran.

ANDERS JOHAN TROED GRÖNWALL.
BJÖRN GUSTAF-ADOLF INGELMAN.

References Cited in the file of this patent

UNITED STATES PATENTS

| Number | Name | Date |
|---|---|---|
| 2,437,518 | Gronwall et al. | Mar. 9, 1948 |

FOREIGN PATENTS

| Number | Country | Date |
|---|---|---|
| 583,378 | Great Britain | Dec. 17, 1946 |

OTHER REFERENCES

Gronwall et al., Nature, January 13, 1945, page 45.

Bull et al., Lancet, January 22, 1949, pages 136–137, 2 pages.

Renfrew et al., J. Am. Pharm. Assoc. Scient. Ed., April 1949, pages 177–179, 3 pages.